Nov. 9, 1954  J. R. VANDER PYL  2,694,121
SENSING UNIT
Filed March 9, 1953  3 Sheets-Sheet 1
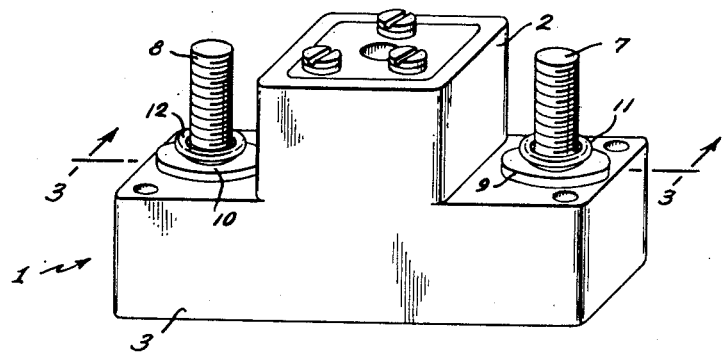
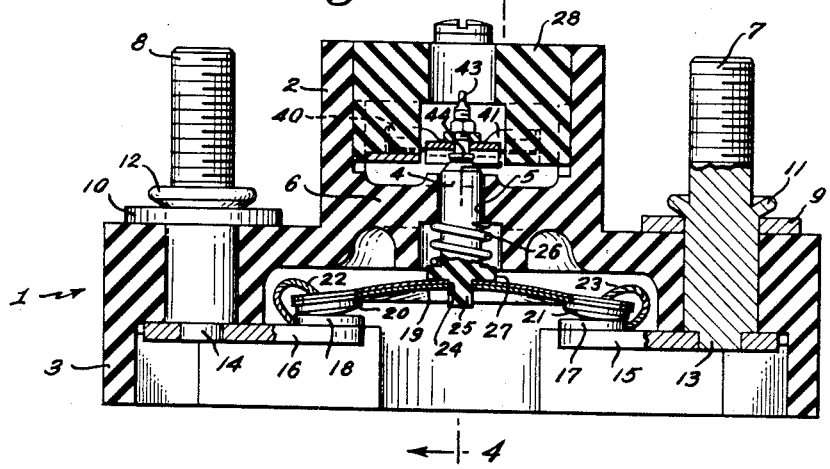
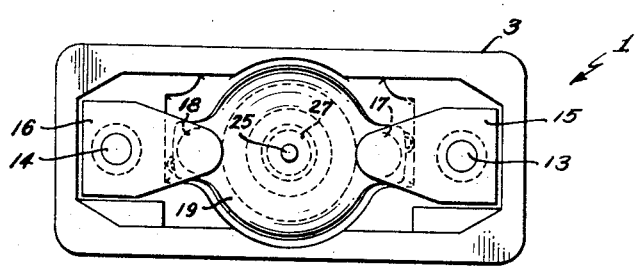
Inventor,
John R. Vanderpyl,
by Townsend M. Gunn
Atty.

Nov. 9, 1954 J. R. VANDER PYL 2,694,121
SENSING UNIT
Filed March 9, 1953 3 Sheets-Sheet 2
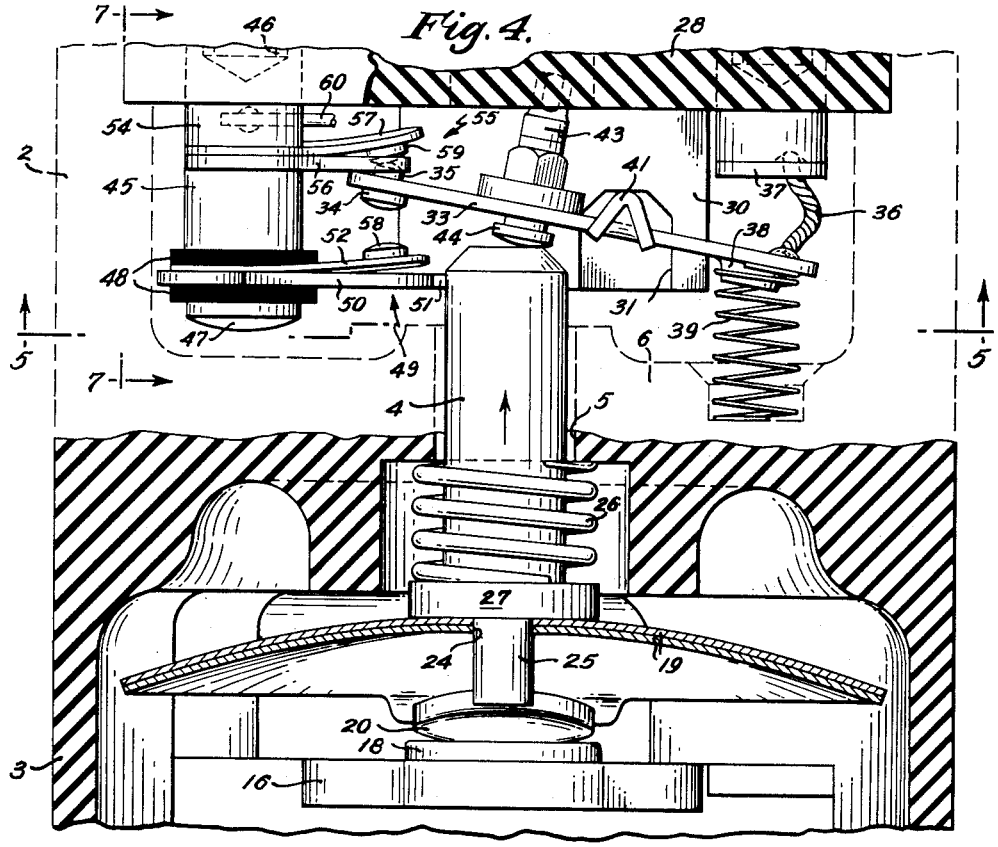
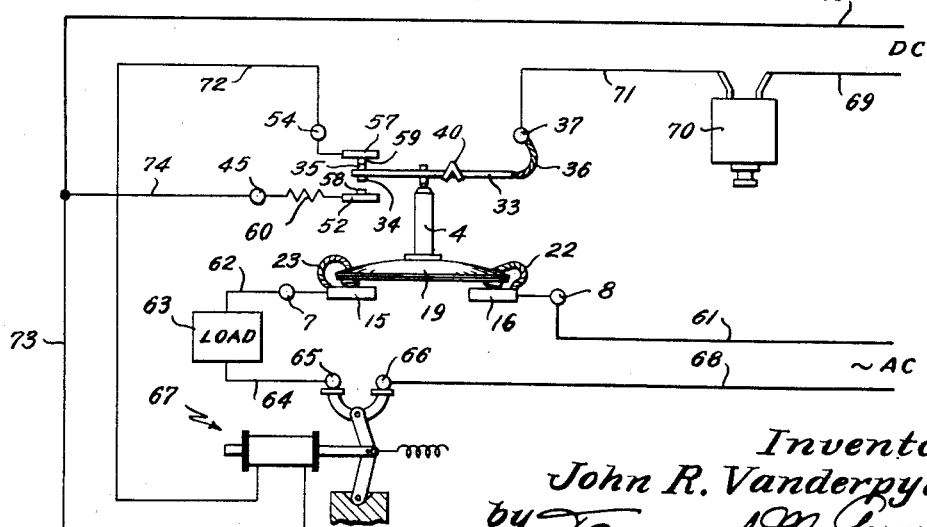
Inventor,
John R. Vanderpyl,
by Townsend M. Gunn,
Atty.

Nov. 9, 1954 J. R. VANDER PYL 2,694,121
SENSING UNIT
Filed March 9, 1953 3 Sheets-Sheet 3
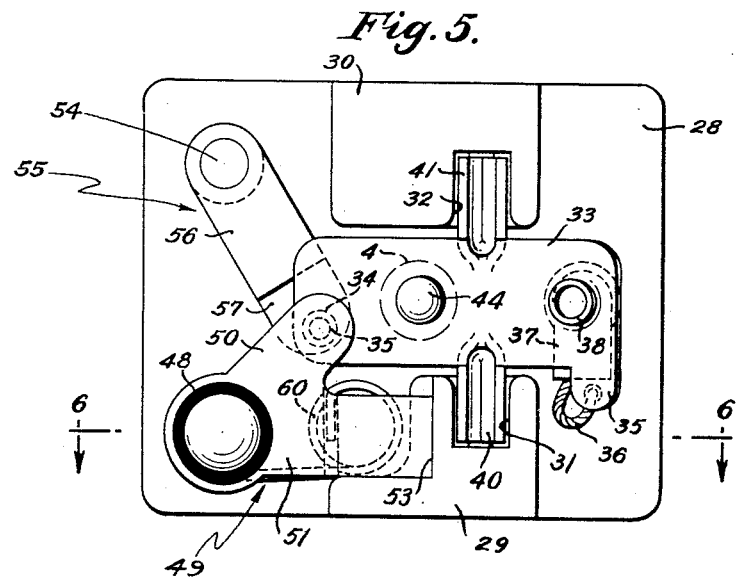
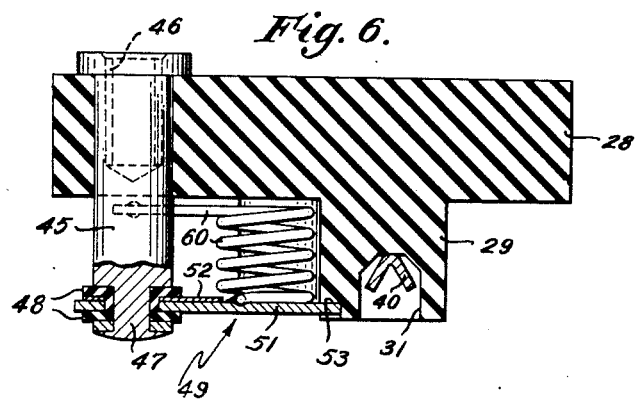
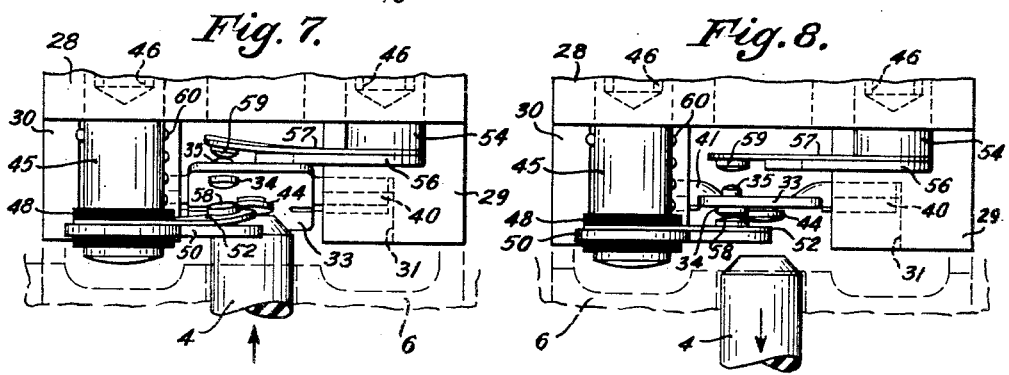
Inventor,
John R. Vanderpyl,
by Townsend M. Gunn
Atty.

United States Patent Office 2,694,121
Patented Nov. 9, 1954

2,694,121

SENSING UNIT

John R. Vander Pyl, Attleboro, Mass., assignor to Metals & Controls Corporation, Attleboro, Mass., a corporation of Massachusetts Application March 9, 1953, Serial No. 341,183

9 Claims. (Cl. 200—114)

This invention relates to thermostatic switches of the snap-acting type and in particular to improved contact structures for such switches.

Among the objects of the invention may be noted the provision of a thermostatic switch in which at least one of the switch contacts is provided with novel means for taking up any residual creep of the snap-acting actuating element; the provision of a switch of the class described in which at least one of the contacts acts as a stop to limit motion of another part of the switch and in addition has means for minimizing creeping of the switch contacts during operation thereof; the provision of a switch and contact structure in which the contacts are sprung in a novel manner so as to minimize or even prevent contact chatter; the provision of a switch of the classes described in which the thermostat element is caused to operate by the heat generated by current passing through it yet does not of itself directly interrupt said current; the provision of a switch of the last named class in which the thermostat element serves to actuate other switch elements mounted in the switch remotely from the thermostat element; the provision of a switch arm-and-contact sub-assembly which is adaptable for use with other switch operating elements; and the provision of a thermostatic switch which is novel and simple to make. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 1 is a perspective view showing one embodiment of the invention;

Fig. 2 is a bottom view of the Fig. 1 embodiment;

Fig. 3 is a vertical section of the Fig. 1 embodiment taken in the direction of sight lines 3—3 on Fig. 1;

Fig. 4 is a vertical section of the Fig. 1 embodiment taken in the direction of sight lines 4—4 on Fig. 3;

Fig. 5 is a bottom view of a switch sub-assembly which forms a part of the Fig. 1 embodiment, taken in the direction of sight lines 5—5 of Fig. 4;

Fig. 6 is an enlarged cross sectional elevation taken on the Fig. 5 structure in the direction of sight lines 6—6;

Figs. 7 and 8 are enlarged fragmentary end elevations showing certain of the parts of the Fig. 6 sub-assembly in two operating positions; and Fig. 9 is a schematic circuit in which the invention may be used.

Similar reference characters indicate corresponding parts throughout the several views of the drawings.

In the use of thermostat elements of the snap-acting kind to actuate switch elements, it is generally desirable and may even be necessary to make some arrangement to prevent the switch contacts from creeping into or away from their closed position. This is sometimes done by providing a lost-motion connection between the snap-acting element and the contacts which it operates. However, in some types of structure such lost motion is not desirable, and other means must be provided. This invention is concerned with solving this problem in a simple, foolproof and economical manner. In addition, the problem of contact chatter is considered and solved in a novel manner. The invention is also concerned with the problem of making a simple "sensing" type unit in which the thermostat element does not itself interrupt the main current in whatever circuit it is included, but instead operates another set of contacts which in turn actuate other switch elements in the circuit to interrupt the main current. In such a "sensing" unit, the main current is passed through the snap-acting thermostat element, and yet, even though the thermal element is provided with contacts, nevertheless these contacts do not interrupt the current but merely serve as a means to pass the main current through the snap-acting element. In this way, the contacts of the thermal element do not become burned by current, and the contacts may be an inherent part of the calibration of the device without fear that such calibration may be changed.

Referring now to the drawings, in Fig. 1 there is shown a casing 1 made of electrical insulating material such as Bakelite or other molded plastic. Base 1, as can be seen by referring to Figs. 2, 3 and 4, comprises an upper case 2 and a lower case 3. The novel switch construction of this invention is enclosed in the upper case 2 and the thermostatic element is contained in the bottom case 3, operative connection between these respective parts being provided by the thrust pin 4 which is slidably mounted in a hole 5 in the partition 6 which separates the upper case from the lower case. Thrust pin 4 is preferably made of electrical insulating material such as a molded plastic or Bakelite.

The terminal posts 7 and 8 are mounted at each end of the lower case 3 by means of the collars 9 and 10 over which portions of the binding post are staked or spun as shown at 11 and 12. (Other forms of mounting may be provided if desired.) Soldered or brazed to the inside ends 13 and 14 of the binding posts 7 and 8 are the stationary contact plates 15 and 16, each of these having brazed or riveted thereto the contacts 17 and 18. An inherently snap-acting thermostat element 19 of the type referred to in the Spencer United States Patent No. 1,448,240 or Vaughan et al. Patent No. 2,317,831 has attached at diametrically opposite points near its periphery the contacts 20 and 21 which bear against the contacts 18 and 17 respectively. The flexible pigtail connection 22 is attached (preferably by welding) to the thermostatic element 19 immediately above contact 20, and is also attached (preferably by welding) to the stationary contact plate 16, as shown. The places of attachment of this pigtail connection do not have to be exactly as indicated, but the end of the pigtail attached to the thermal element 19 should be close to the place where contact 20 is attached to element 19. Similarly, pigtail 23 is attached to element 19 above contact 21 and to stationary contact plate 15, as shown. By this construction, it is apparent that even though contact 21 should momentarily separate from contact 17, and contact 20 momentarily from contact 18, nevertheless current which is traversing thermal element 19 from contact plate 15 and out through contact plate 16, will not be interrupted. A hole 24 is provided in the thermal element to receive the reduced end portion 25 of the thrust pin 4. A spring 26 is provided which bears against a shoulder 27 provided on the end of thrust pin 4 and against the under side of partition 6, as shown. Spring 26 is of the compression type and therefore forces the thrust pin 4 against the thermal element 19.

A mounting plate 28 likewise made of electrical insulating material such as Bakelite or other molded plastic, fits snugly into the upper case 2 and rests against suitably provided ledges therein. While the fastening means are not shown, plate 28 may be held in place by means of fastening screws passing through the wall of case 2 and into the plate 28. Mounting plate 28 carries the switch elements of this device which are to be used to actuate another relay.

Referring now to Figs. 4, 5, 6 and 7, plate 28 is provided with two oppositely mounted abutments 29 and 30 which preferably are molded as an integral part of plate 28. Each of abutments 29 and 30 is provided with the pivot-receiving recesses 31 and 32 which extend downwardly from the top of the abutments. A switch arm 33 is provided on which are provided at one end thereof the contacts 34 and 35, one above the other on opposite sides of the switch arm. At the other end of the switch arm is provided the tab 35 to which is soldered or welded the flexible pigtail connection 36. The other end of pigtail 36 is soldered or welded to the terminal 37 which extends through the plate 28 and is provided with a threaded hole for a terminal screw. Also at this end of the switch arm 33 is provided the upstanding boss 38, the purpose of which is to hold one end of a compression spring 39, the other end of spring 39 resting against the partition 6 in order to exert pressure on the switch arm 33. Outwardly from the sides of the switch arm extend two V-shaped pivot members 40 and 41 which are formed as integral parts of the switch arm and are bent in a V-shape to provide knife edges serving to support the switch arm on the bottoms of the recesses 31 and 32, thus enabling the switch arm 33 to pivot under the influence of the spring 39 and the thrust pin 4. A threaded hole 42 is provided in the switch arm 33 into which is threaded the adjusting screw 43. Adjusting screw 43 has a head 44 against which the upper end of the pin 4 bears. A lock nut is provided to hold adjusting screw 43 in switch arm 33 when the proper adjustment has been made. Thus it will be seen that switch arm 33 is acted upon by the forces of the spring 39 and of the thrust pin 4 applied on opposite sides of the knife edges 40 and 41.

A mounting post 45 is provided which is preferably integrally molded into the plate 28, but other means of attaching may be used if desired. Mounting post 45 is provided with the threaded hole 46 for the purpose of receiving a terminal screw. On the inner end of post 45 there is provided the reduced end 47 adapted to receive the insulating washers 48 and the contact plate 49, the several washers being provided to insulate, according to standard practice, the contact plate 49 from the mounting post 45.

Contact plate 49 is bifurcated and has the relatively rigid legs 50 and 51, and the flexible arm 52 (see Figs. 4 and 5), arm 52 being mounted on the top side of the composite contact plate. Arm 52 is normally biased away from rigid leg 50 as shown in Figs. 4 and 7. It is electrically connected to leg 50 by being clamped between leg 50 and insulating washer 48 on mounting post 45, or by being welded to leg 50. Leg 50 (together with the flexible arm 52) underlies contact 34, and leg 51 overlies the abutment 29, the abutment 29 being provided with a shoulder 53 (see Fig. 6) to receive the end of leg 51. Supported on mounting post 54, which also is preferably integrally molded into base 28, is another contact plate assembly indicated generally by numeral 55. Contact plate 55 comprises the rigid leg 56 and the flexible arm 57, these two portions being electrically connected together by reason of being clamped onto the end of mounting post 54. Flexible arm 57 is biased downwardly (see Fig. 8) to rest against the rigid leg 56 in its normal state. It will be observed that the rigid leg 56 is shorter than flexible portion 57 so that the end of the latter may extend outwardly therefrom and overlie contact 35.

Contacts 58 and 59 are provided on the ends respectively of flexible arms 52 and 57 in order to engage contacts 34 and 35.

Attached (preferably by welding), by one end to mounting post 45 is the resistance element 60. The other end of resistance element 60 is attached (preferably by welding) to leg 51.

The operation of the device is as follows: In the position of the elements shown in Figs. 3 and 7, the thermostat element 19 is cold and electrically connects, as shown, contacts 17 and 18. At the same time, it is pushing upwardly on thrust pin 4, which in turn is pushing upwardly against the inner end of the adjusting screw 43 to force the switch arm 33 upwardly (against the resisting force of the spring 39) so that contact 35 engages contact 59, forcing the latter and the flexible arm 57 back until the contact arm 33 strikes rigid leg 56. Since the contact arm 33 is thus prevented from further upward motion, the thermal element 19 may be adjusted to take out any initial creep and also to adjust its operating temperature by turning the adjusting screw 43 downwardly, thus reducing the amount of "dish" in the disc. (Such reduction of the dish will lower the temperature to which the disc must be raised in order to cause it to snap.) If the current is now passed through the device from terminal 7, contact plate 15, contact 17, contact 21 (and also through the parallel pigtail connection 23), thermal element 19, contact 20, contact 18, contact plate 16 (and also through the parallel pigtail connection 22) and out through terminal 8, this current will heat the thermal element 19 until it reaches its snapping temperature, at which point it will snap to a position of opposite concavity from that shown in the drawings. In so doing, it may momentarily cause contacts 20 and 21 to leave, respectively, contacts 18 and 17, but the current still continues to flow through the pigtails 22 and 23. The spring 26 will then exert force against the thrust pin in a downward direction (as drawn) to move the thermal element downward sufficiently to bring the respective contacts together again. Thrust pin 4, however, in moving downwardly allows spring 39 to force its end of switch arm 33 upwardly and thus move the contact end of the switch arm 33 downwardly. This forces contact 34 against contact 58, which in turn causes flexible arm 52 to bend backwardly against its own resilience. This is shown in Fig. 8.

Generally, the disc 19 will snap further than the motion of contact arm 33, so that the end of thrust pin 4 leaves the adjusting screw 43. In this position, it is to be noted that the switch arm 33 is balanced against the two spring forces, one from spring 39 and the other from flexible arm 52. By this means, chattering of the contacts is minimized or even prevented. Fig. 8 shows this position of the switch arm 33, and it is to be noted that even though the flexible arm 52 is shown pressed against the rigid arm 50, the force exerted by arm 52 is springingly opposed to the force of spring 39.

As the thermal element 19 cools (assuming that the current therethrough has been interrupted by the operation of another switch in the main circuit), the thermal element will start its motion back to its former cold position but in so doing it will undergo the creep motion which is an inherent characteristic of such snap-acting devices. However, contact 34 does not leave contact 58 during such creep motion because the resilience of the flexible arm 52 will cause contact 58 to accompany contact 34 for a portion of its upward motion. The relation of the amount that flexible arm 52 travels is such that by the time it has reached the limit of its upward motion, thermal element 19 will have already passed into the snap motion part of its return journey, and thus the separation of contact 34 from contact 58 will be a snap separation without creeping.

Similarly, the downward bias of the flexible arm 57 toward the rigid arm 56 assists in compensating for any residual creep of the thermal element 19 during the heating part of the cycle, which may not have been eliminated by adjustment of the adjusting screw 43.

It will be observed that in the operation of thermal element 19, the main circuit is not interrupted. It is the purpose of this kind of sensing device not to have the device itself interrupt the main current. The operation of the sub-assembly, comprising the switch plate 28, the switch arm 33 and the contacts 58, 34, 35 and 59, is intended to operate other circuit switches which are capable of interrupting the main current. Thus the interruption of the main current is removed from the contacts of the present device and these latter therefore do not become pitted or worn. As a result, the adjustments of the device remain precisely as set, and the device retains accurately its adjusted operating temperatures.

The resistance element 60 is provided in some cases to limit the current to ground, (or to act as a fusible element which will burn out), and thus protect another current carrying device in the circuit. Such a circuit is illustrated schematically in Fig. 9 which shows the device of this invention connected for control purposes to a direct current supply, but with its thermal element carrying alternating current. The main alternating current flows through wire 61, terminal 8, contact plate 16, thermal element 19 (and pigtails 22 and 23), contact plate 15, terminal 7, wire 62, load 63, wire 64, the contacts 65 and 66 of an auixiary electromagnetic circuitbreaker indicated generally by numeral 67, and back by wire 68 to the power source. The control circuit connections are as follows: From one side of the direct current power source direct current flows by wire 69, through a manually resettable indicating type circuit breaker 70

(which may be of the type shown in the Bolesky United States Patent No. 2,371,672), wire 71, terminal 37, pigtail 36, switch arm 33, contact 35, contact 59, contact arm 57, wire 72, through the coil of circuit breaker 67, and back to the power source by wire 73. With these connections, it will be observed that circuit breaker 67 is controlled both by the switch arm 33 and the circuit breaker 70.

If, now, excessive current flows in the main power circuit, element 19 will heat to its snapping temperature, and will snap to allow switch arm 33 to pivot downwardly to close a circuit including wire 69, circuit breaker 70, wire 71, terminal 37, pigtail 36, switch arm 33, contact 34, contact 58, contact arm 52, resistance element 60, terminal post 45, and back by wires 74 and 73 to the other side of the direct current power source. The operation of switch arm 33 breaks the connection to the circuit breaker 67, and thus opens the main load circuit. In addition, it will be observed that circuit breaker 70 is now connected across the direct current power source through resistance 60. The resulting current will cause circuit breaker 70 to operate to break the circuit through it. The resistance 60 limits the current to a safe value for circuit breaker 70.

After circuit breaker 70 opens, it remains open until manually reset. Element 19 meanwhile cools and snaps back to its original shape, thus moving switch arm 33 into its former position. When circuit breaker 70 is now reclosed, circuit breaker 67 will close to energize the load 63 again.

If desired, and circuit breaker 70 can withstand the resulting current flow without injury, element 60 may be omitted, in which event the insulating washers 48 are also omitted, so that the contact plate 49 receives current directly from the mounting post 45. In this case, operation of switch arm 33 will place circuit breaker 70 directly across the direct current power source.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A thermostatic switch comprising a base; a thermostatic element mounted on said base; at least one stationary contact mounted on said base; at least one first movable contact carried by said element and engaging said stationary contact to provide an electrically conductive path; a switch arm movably mounted on said base and adapted to be actuated by said element; at least one second movable contact yieldingly mounted on said base and biased in one direction; at least one third movable contact carried by said switch arm and engaging said second movable contact in one position of said switch arm to provide an electrically conductive path; and spring means engaging said switch arm and biasing it in one direction, the force of said spring means opposing, by means of said switch arm, the force biasing said movable contact.

2. A thermostatic switch comprising a base; a thermostatic element mounted on said base; at least one stationary contact mounted on said base; at least one first movable contact carried by said element and engaging said stationary contact to provide an electrically conductive path; at least one flexible electrical connector connecting said first movable contact to said stationary contact, thereby providing a shunt path electrically in parallel with said contacts; a switch arm movably mounted on said base and adapted to be actuated by said element; at least one second movable contact yieldingly mounted on said base and biased in one direction; at least one third movable contact carried by said switch arm and engaging said second movable contact in one position of said switch arm to provide an electrically conductive path; and spring means engaging said switch arm and biasing it in one direction, the force of said spring means opposing, by means of said switch arm, the force biasing said second movable contact.

3. A thermostatic switch comprising a base; a thermostatic element mounted on said base; at least one stationary contact mounted on said base; at least one first movable contact carried by said element and engaging said stationary contact to provide an electrically conductive pack; spring means urging said first movable contact into engagement with said stationary contact; a switch arm movably mounted on said base and adapted to be actuated by said element; at least one second movable contact yieldingly mounted on said base and biased in one direction; at least one third movable contact carried by said switch arm and engaging said second movable contact in one position of said switch arm to provide an electrically conductive path; and second spring means engaging said switch arm and biasing it in one direction, the force of said second spring means opposing, by means of said switch arm, the force biasing said second movable contact.

4. A thermostatic switch comprising a base; a thermostatic element mounted on said base; at least one stationary contact mounted on said base; at least one first movable contact carried by said element and engaging said stationary contact to provide an electrically conductive path; at least one flexible electrical connector connecting said first movable contact to said stationary contact, thereby providing a shunt path electrically in parallel with said contacts; spring means urging said first movable contact into engagement with said stationary contact; a switch arm movably mounted on said base and adapted to be actuated by said element; at least one second movable contact yieldingly mounted on said base and biased in one direction; at least one third movable contact carried by said switch arm and engaging said second movable contact in one position of said switch arm to provide an electrically conductive path; and second spring means engaging said switch arm and biasing it in one direction, the force of said second spring means opposing, by means of said switch arm, the force biasing said second movable contact.

5. A thermostatic switch comprising a base; a thermostatic element mounted on said base; at least one stationary contact mounted on said base; at least one first movable conact carried by said element and engaging said stationary contact to provide an electrically conductive path; a switch arm movably mounted on said base and adapted to be actuated by said element; a second movable contact yieldingly mounted on said base and biased in one direction; a third movable contact yieldingly mounted on said base and biased in a direction opposite to the bias of said second movable contact; contacts carried by said switch arm, one of which engages said second movable contact to provide an electrically conductive path when the switch arm is in one of its positions, and the other of which engages said third movable contact to provide an electrically conductive path when the switch arm is in another of its positions; and spring means engaging said switch arm and biasing it in one direction; the force of said spring means opposing, by means of said switch arm, the force biasing one of said second and third movable contacts.

6. A thermostatic switch comprising a base; at least one stationary contact mounted on said base; at least one first movable contact carried by said element and engaging said stationary contact to provide an electrically conductive path; a switch arm movably mounted on said base and adapted to be actuated by said element; at least one second movable contact yieldingly mounted on said base and biased in one direction; a contact carried by said switch arm and engaging said second movable contact in one position of said switch arm to provide an electrically conductive path; and rigid stop means mounted on said base and stopping the motion of said switch arm after the contact carried by the latter has resiliently engaged said second movable contact.

7. A thermostatic switch comprising a base; a thermostatic element mounted on said base; at least one stationary contact mounted on said base; at least one first movable contact carried by said element and engaging said first stationary contact to provide an electrically conductive path; a switch arm movably mounted on said base and adapted to be actuated by said element; a second movable contact yieldingly mounted on said base and biased in one direction; a third movable contact yieldingly mounted on said base and biased in a direction opposite to the bias of said second movable contact; first contacts carried by said switch arm, one of which engages said second movable contact to provide an electrically conductive path when the switch arm is in one of its positions, and the other of which engages said third movable contact to provide an electrically conductive path when the switch arm is in another of its positions, first rigid stop means overlying said second movable contact; second rigid stop means overlying said third movable contact and positioned to be engaged by said switch arm when one of the contacts of the switch arm resiliently engages said third movable contact; and spring means engaging said switch arm and biasing it in a direction away from the position in which said switch arm engages said second rigid stop, the force of said spring means opposing, by means of said switch arm, the force biasing said second movable contact when said switch arm is in said one position.

8. A switch assembly comprising a base, a switch arm movably mounted on said base; contacts carried by one end of said switch arm; a first movable contact yieldingly mounted on said base, biased in one direction, and having associated therewith a first rigid stop means; and a second movable contact yieldingly mounted on said base, biased in one direction, and having associated therewith a second rigid stop means; the contacts carried by said switch arm being interposed between said first and second movable contacts, and the end of said switch arm resting against said second rigid stop means when said switch arm is in a position to have one of the contacts carried by it resiliently engage said second movable contact to provide an electrically conductive path.

9. A switch assembly comprising a base; a switch arm movably mounted on said base; contacts carried by one end of said switch arm; a spring blade mounted on said base by one end and carriing a first movable contact at its other end; a first rigid cantilever-mounted arm overlying said spring blade, said spring blade being biased in a direction away from said first arm; a second spring blade mounted by one end on said base and carrying a contact at its other end; and a second rigid cantilever-mounted arm overlying said second spring blade for a portion of its length, said second spring blade being biased in a direction toward said second arm; the contacts carried by said switch arm being interposed between said spring arms and being movable by said switch arm to engage either the contact on the said first spring blade or the contact on the said second spring blade to provide electrically conductive paths between the contacts on said switch arm and the contact on the first spring blade and the contact on the second spring blade; and said second rigid arm constituting a stop member for said switch arm when the contact on said second spring blade is resiliently engaged by a contact on said switch arm.

References Cited in the file of this patent

UNITED STATES PATENTS

| Number | Name | Date |
|---|---|---|
| 2,309,207 | Newton | Jan. 26, 1943 |
| 2,414,531 | Johns | Jan. 21, 1947 |
| 2,468,996 | Olson | May 3, 1949 |